March 1, 1932.   N. L. JACOBUS   1,847,876
TIRE SHOE
Filed March 27, 1929
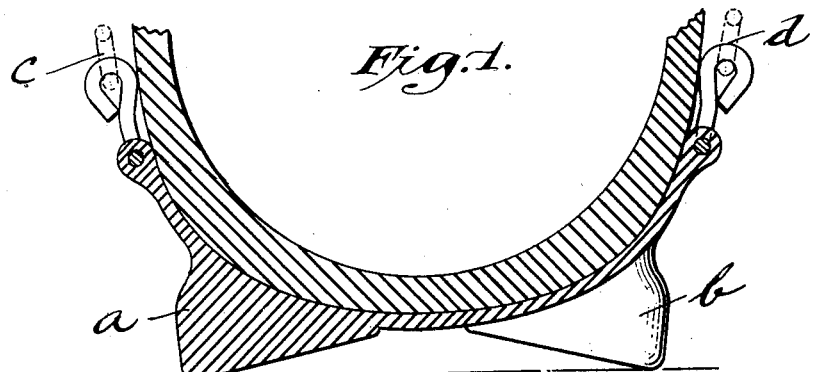
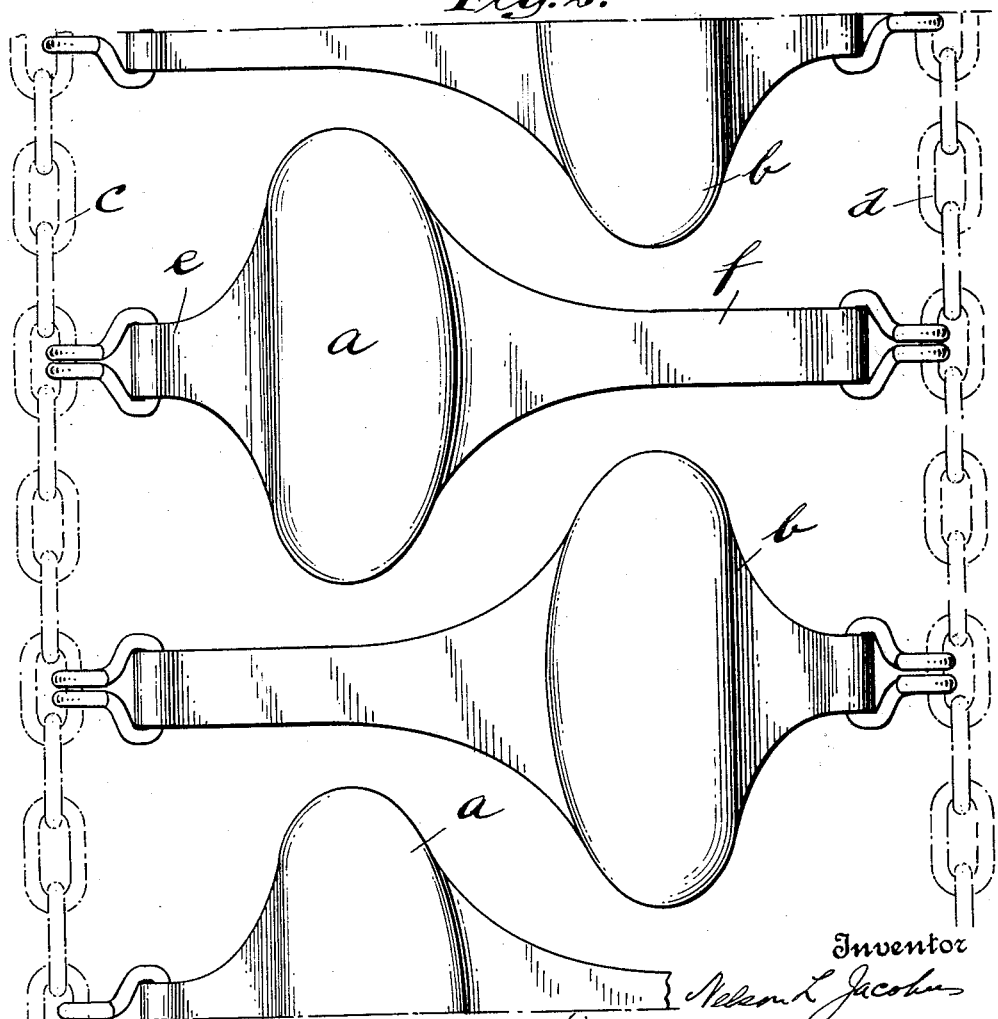
Inventor
Nelson L Jacobus
By his Attorney Patented Mar. 1, 1932

1,847,876

UNITED STATES PATENT OFFICE

NELSON L. JACOBUS, OF HEMPSTEAD, NEW YORK

TIRE SHOE

Application filed March 27, 1929. Serial No. 350,205.

This invention relates to tire shoes to be used for automobiles or other vehicles, and has for its main object and feature the provision of means whereby a tendency to skid will be counteracted.

In the accompanying drawings the invention is disclosed in a concrete and preferred form in which Fig. 1 is a cross-sectional view of a tire shoe showing one form of the invention;

Fig. 2 is a plan view development of the parts shown in Fig. 1.

The invention consists in providing the tire shoe with a tread that is substantially concave in cross-section. By "concave" is here meant a conformation such as is shown in Fig. 1 or any conformation that would be the mechanical equivalent thereof.

It will be apparent from an inspection of Fig. 1 that the tread, instead of engaging the road at the center of the wheel, engages it at the two side edges and the center of the tread is not in contact with the road. Consequently any tendency to skid will be resisted because said edge portions will on account of their shape and position and the leaverage from the center of the tread to the side edges powerfully oppose sidewise displacement. It will be evident that such resistance is far greater than in the case of the convex tread now in use.

The details of construction may, of course, vary widely. In Figs. 1 and 2 the tread portions $a$ and $b$ are in the form of cross-links made of rubber or other suitable material and connected to the circumferential chains $c$ and $d$. The two sets of tread portions $a$ and $b$ are therefore in effect in parallel relation circumferentially and in staggered and overlapping relation with respect to each other. To carry this feature into effect each tread portion $a$ or $b$ is provided with narrow extensions $e$ and $f$ which are fastened to chains $c$ and $d$ and adjacent portions $a$ and $b$ are reversely arranged with respect to each other.

I claim:

The combination with a tire shoe, of two sets of non-metallic tread portions arranged in parallel relation circumferentially and in overlapping staggered relation with respect to each other constituting a tread substantially concave in cross-section, each tread portion having a relatively short extension at one side and a relatively long extension at the other side, adjacent tread portions being reversely arranged with respect to each other, and flexible members connecting the extensions of the tread portions.

Signed at Brooklyn, New York city, in the county of Kings, and State of New York, this 25th day of March, 1929.

NELSON L. JACOBUS.